Figure 1:
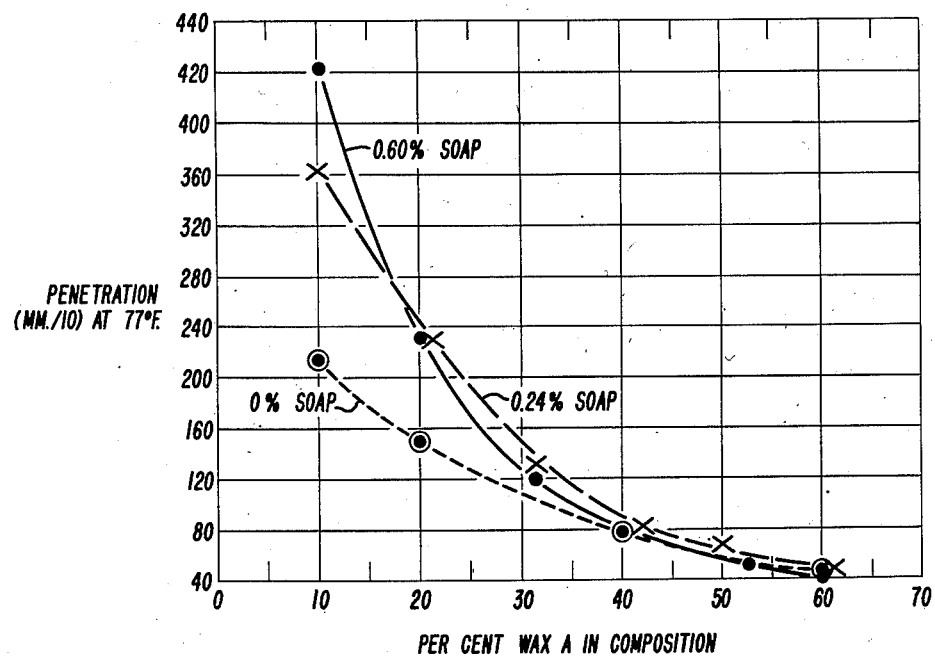

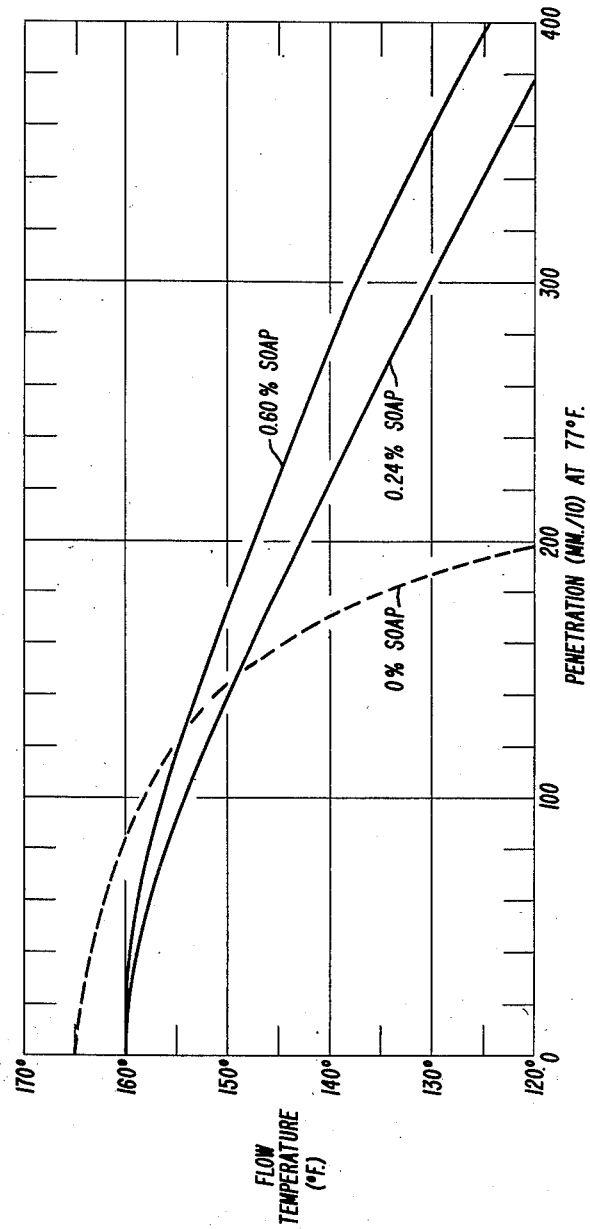

United States Patent Office 2,816,842
Patented Dec. 17, 1957

2,816,842

RUST PREVENTIVE COMPOSITIONS

Roy A. Westlund, Jr., Linden, and Michael J. Furey, Cranford, N. J., assignors to Esso Research and Engineering Company, a corporation of Delaware Application March 28, 1955, Serial No. 497,068

2 Claims. (Cl. 106—14)

This invention relates to rust preventive compositions and more particularly relates to hot-dip rust preventive compositions which contain mineral oil, wax and metal soap, the compositions being substantially free from flow at temperatures below about 130° F. The invention also relates to methods for protecting metal objects from corrosion using such compositions.

Hot-dip rust preventive compositions are used to protect metallic surfaces from corrosion under a variety of conditions. Such compositions are particularly useful for preventing the rusting of ferrous metal objects. The use of such compositions protects metallic surfaces from humidity, rain, sea water and the like. The advantage of hot-dip rust preventives over, for example, solvent-type rust preventive compositions is that after the part to be protected is coated, it can be packaged immediately with essentially no delay for drying. Also, there is no fire hazard from solvents. In addition, the protective films of hot-dip rust preventive compositions are soft and thus do not readily chip or flake off to leave metal parts exposed if the film is accidentally struck. Instead, the soft film will heal itself. Also, since the film is soft, any film not removed from metal parts, such as from bearings and the like, does not interfere with subsequent lubrication.

Hot-dip rust preventives of various consistencies may be prepared. Harder coatings generally give better protection and are used to protect metal parts in exposed conditions, outdoor or semi-sheltered. Softer coatings have the advantage that they are more easily removed while at the same time providing only slightly less protection than the harder coating. The softer products are particularly useful for protective shed storage or for preservation of metal parts which are to be packaged.

Hot-dip rust preventive compositions have been prepared heretofore using a blend of a heavy mineral oil and wax. However, in general such rust preventive compositions have had to be made relatively hard (that is, having an A. S. T. M. penetration below about 200 mm./10 at 77° F.) to prevent their flow from metal surfaces. These hard compositions have been difficult to apply and remove from metal surfaces. Rust preventive compositions (prepared from oil and wax) of a softer consistency, that is, having an A. S. T. M. penetration above about 200 mm./10 at 77° F. have not been practical heretofore since they have had a low melting point and have also tended to flow at temperatures above about 100° F. Since a large part of the protection afforded by these rust preventives is of a physical nature, it is essential that the protective film resist flow at elevated temperatures. Heretofore it is not believed that the hot-dip rust preventive compositions of the oil-wax base type having an A. S. T. M. penetration above about 200 mm./10 and which are also resistant to flow at all temperatures below about 130° F. have been prepared.

It has now been found that the addition of minor amounts of metal soaps of high molecular weight fatty acids to an oil-wax base rust preventive composition imparts to the composition excellent resistance to flow at all temperatures below about 130° F. The addition of these metal soaps to the oil-wax base does not harden the composition and, in fact, actually softens the composition slightly. The addition of these metal soaps is also advantageous since it permits the use of additional wax and thus further enhances the anti-flow properties of the composition.

The rust preventive compositions of this invention comprise a major proportion of a heavy mineral oil, about 8 to 30% by weight, based on total composition, of microcrystalline wax and about 0.1 to 2% by weight, based on the total composition, of metal soap of high molecular weight fatty acid, the total composition having an A. S. T. M. penetration of about 200 to 325 mm./10 at 77° F. and being substantially free from flow at temperatures below about 130° F. The properties of the rust preventive compositions of this invention may be further enhanced by the addition of minor amounts of additives such as corrosion inhibitors, oxidation inhibitors and the like.

The advantages of the present invention will be more fully understood by reference to the attached drawings of which Fig. 1 is a graph showing the relationship between the A. S. T. M. penetration of wax-oil base rust preventive compositions and the metal soap content thereof and Fig. 2 is a graph showing the relationship between A. S. T. M. penetration, flow temperature and the metal soap content wax-oil base rust preventive compositions.

Fig. 1 shows that the addition of minor amounts of metal soaps generally increases the A. S. T. M. penetration of wax-oil base rust preventive compositions. Fig. 2 shows that wax-oil base rust preventive compositions having an A. S. T. M. penetration of about 200 to 325 and being resistant to flow at temperatures below 130° F. can be prepared utilizing minor amounts of metal soaps.

THE HEAVY MINERAL OIL

The heavy mineral oils useful in the present invention in general have an S. U. S. viscosity at 210° F. in the range of about 100 to 500 seconds. Preferred mineral oils have an S. U. S. viscosity at 210° F. of about 150 to 300 seconds. Mineral oils having lower viscosities are undesirable because they tend to volatilize at temperatures of about 170° to 200° F., which temperatures are employed during the application of the rust preventive compositions to metal objects. In addition, mineral oils having a viscosity below 100 seconds have an undesirable effect upon the flow properties of the rust preventive composition.

The preferred heavy mineral oils are those having a pour point below about 30° F. Such mineral oils may be fractions from low cold test crude oils which contain only small amounts of naturally occurring wax. Such mineral oils may also be obtained from waxy crude oils by removing essentially all of the wax therefrom by a dewaxing step such as solvent (MEK, propane, etc.) dewaxing, plate and frame pressing and the like. Such heavy mineral oils are preferred since they are essentially free of low melting point wax, particularly waxes melting below about 130° F.

THE WAX

The waxes useful in this invention are high melting point waxes having a melting point in the range of about 155° to 210° F. Such waxes are known in the art as microcrystalline waxes and are obtained as a by-product from the dewaxing of heavy mineral oils such as cylinder oils and bright stocks. The waxes of this invention preferably have a melting point of about 170° to 200° F. In the preferred embodiment of this invention, these microcrystalline waxes are added to the heavy mineral oil to form an oil-wax base for the rust preventive compositions of this invention. It will be understood, however, that it is within the scope of this invention to utilize naturally-occurring waxy oils which have an S. U. S. viscosity at 210° F. of about 100 to 500 seconds which contain the proper amount (about 8 to 30% by weight) of these microcrystalline waxes and which are essentially free of lower melting point waxes, particularly those melting below about 130° F. Also, if desired, the microcrystalline wax may be added in the form of a petrolatum, that is, a wax containing a relatively high proportion of oil, such as 10% to 60% by weight of oil, and 90% to 40% by weight of microcrystalline wax. The preferred microcrystalline waxes are commercial waxes containing less than about 5%, and preferably less than about 2%, by weight of oil.

THE METAL SOAPS

The soaps useful in this invention are those of the grease-forming metals and those of high molecular weight fatty acids. Preferably the metals are those selected from the group consisting of alkali metals, alkaline earth metals and aluminum. Specific examples of such metals include sodium, potassium, lithium, strontium, calcium, barium, magnesium and aluminum. It will be understood that two or more of these metals may be employed in the same rust preventive composition if desired. A particularly preferred rust preventive composition contains a mixture of lithium and calcium soaps.

The high molecular weight fatty acids preferably contain about 12 to 22 carbon atoms per molecule and even more preferably contain about 14 to 18 carbon atoms per molecule. These fatty acids may be derived from saturated or unsaturated naturally-occurring or synthetic fatty materials. The fatty acids normally used in the manufacture of greases may be employed in this invention, such as stearic, hydroxystearic, dihydroxystearic, polyhydroxystearic, oleic, linoleic, ricinoleic, myristic, palmitic, hydrogenated fish oil acids, tallow acids, etc.

Specific examples of metal soaps useful in this invention include aluminum stearate, mixed lithium and calcium soaps of tallow acids, lithium stearate, calcium stearate, barium stearate, sodium stearate, potassium stearate, lithium soaps of cottonseed fatty acids, calcium soaps of cottonseed fatty acids, mixed lithium and calcium soaps of cottonseed fatty acids, and the like.

The metal soaps may be added as such to the rust preventive compositions of this invention or they may be prepared, as in grease making, in a lubricating oil and the resultant grease may be added to the rust preventive compositions of this invention in a concentration to give the desired proportion of soap in the rust preventive compositions. For example, the soaps of this invention may be prepared in lubricating oils to give greases containing about 5 to 50% by weight of the soap constituent. In this case, conventional grease-making procedures may be employed to prepare such greases. For example, about half of the lubricating oil, preferably a mineral lubricating oil, is added together with the fatty acids to a grease-making kettle and the metal may be added in the form of a basic reacting compound, such as a hydroxide or oxide, in approximately theoretical amounts (based on the amount of fatty acid) to the grease kettle to neutralize the acids. The composition may then be heated to an elevated temperature above about 212° F., such as 300° to 500° F., the remainder of the lubricating oil added and the grease cooled. Such grease-making procedures are well known in the art and need not be discussed further herein.

As stated heretofore, a particularly preferred metal soap useful in this invention is a combination of lithium and calcium soaps of high molecular weight fatty acids. Such a combination containing in the range of about 2:1 to 8:1 and preferably in the range of about 3:1 to 5:1 moles of lithium soap to moles of calcium soap are particularly preferred. Such soaps may be conveniently prepared in the presence of a mineral lubricating oil sufficient to give a final soap content in the resultant grease of about 5 to 50 wt. percent, preferably about 6 to 20 wt. percent. These greases containing the lithium-calcium soaps are preferably prepared utilizing dehydration temperatures in the range of about 220 to 320° F.

THE RUST PREVENTIVE COMPOSITIONS

The rust preventive compositions of this invention comprise a major proportion of a heavy mineral oil, about 8 to 30% by weight, based on the total composition, of microcrystalline wax and about 0.1 to 2% by weight, based on the total composition, of metal soap of high molecular weight fatty acid. These compositions should have an A. S. T. M. penetration (A. S. T. M. designation D937–49T) of about 200 to 325 mm./10 at 77° F. These limits are required to produce a composition that is soft enough to be applied easily even by brush and also to be easily removed. The composition should also have a melting point above about 135° F. to assure that it will give good protection at elevated temperatures. In addition the composition should be substantially free from flow at all temperatures below about 130° F. so as to also assure satisfactory performance of the compositions at elevated temperatures. Since metal parts located in semi-sheltered or sheltered shed storage or packaged metal parts in transit can reach temperatures as high as 130° F., it is essential that the rust preventive composition must not melt nor flow from such metal parts at such temperatures. Preferred compositions of this invention contain about 60 to 90% by weight of the heavy mineral oil, about 10 to 25% by weight of the microcrystalline wax and about 0.2 to 1% by weight of the metal soap. The various ingredients may be blended together simply by heating them to a temperature of about 170° to 200° F. with stirring.

In addition to the oil, wax and soap, other materials such as dyes, e. g. fluoroescein; oxidation inhibitors, e. g. phenyl alpha naphthylamine; and the like may be added in minor amounts to the compositions of the present invention. Although the oil-wax-soap blends of this invention provide physical protection against rusting and the soap serves as a rust inhibitor, the preferred rust preventive compositions of this invention contain a small amount, about 0.1 to 10%, and preferably about 2 to 6% by weight based on the total composition, of additional rust inhibitor such as calcium petroleum sulfonate, barium petroleum sulfonate, sodium petroleum sulfonate, calcium alkyl benzene sulfonate, barium alkyl benzene sulfonate, sodium alkyl benzene sulfonate, sorbitan monooleate, glycerol monooleate, degras and the like or mixtures thereof so as to further improve the rust preventive properties of the total composition.

An example of a particularly preferred hot-dip rust preventive composition of this invention has the following formulation:

| Ingredient | Wt. Percent, Based on Total Composition |
| --- | --- |
| Mineral Oil (150–300 S. U. S. at 210° F.) | 70.0 to 80.0 |
| Micro. Wax (170°—200° F. M. P.) | 12.0 to 18.0 |
| Metal Soaps | 0.2 to 0.5 |
| Calcium Sulfonate | 2.0 to 4.0 |
| Phenyl α-naphthylamine | 0.1 to 1.0 | where the metal soaps are lithium and calcium soaps of fatty acids containing about 14 to 18 carbon atoms per molecule, the molar ratio of lithium soap to calcium soap being about 3:1 to 5:1.

The rust preventive compositions of this invention may be conveniently applied to metallic objects by heating the composition sufficiently to make it fluid, such as heating it to about 170° to 200° F. and then dipping the metallic object into the heated rust preventive composition. If desired, the unheated or heated fluid rust preventive composition may be applied by brushing, swabbing or other equivalent means at temperatures above about 60° F.

The invention will be more fully understood by reference to the following examples. It is pointed out, however, that the examples are given for the purpose of illustration only and are not to be construed as limiting the scope of the present invention in any way.

Example I

A number of different oil-wax bases were prepared using a heavy mineral oil and a number of different waxes. The oil, hereinafter referred to as the base oil, had an S. U. S. viscosity at 210° F. of about 200 and a pour point of about 0° F. The base oil was derived from a low cold test Coastal crude oil which was essentially free from wax constituents. The following waxes were utilized in the preparation of the oil-wax bases:

*Wax A.*—This wax is a further refinement of wax B which has been deoiled and recrystallized to eliminate the lower melting point waxes. It has the following properties: melting point, about 175° F.; penetration (ASTM D–5), about 20; oil content, about 1.2%.

*Wax B.*—This wax is a petrolatum prepared from a paraffinic crude. It is obtained by deasphalting and solvent dewaxing the residuum from a crude distillation, and has the following properties: melting point, about 164° F.; penetration (ASTM D–5), about 90; oil content, about 25%.

*Wax C.*—This wax is a so-called "tank bottom wax" obtained from Mid-Continent crudes. When crude oil is pumped from the ground and allowed to stand in field tanks a certain amount of resins, asphaltenes, and high melting point waxes known loosely as "tank bottoms" precipitate from the crude. This wax is prepared by dehydrating, deasphalting and recrystallizing this mixture to remove asphaltenes, resins, and lower melting point waxes. This wax has the following general properties: melting point, about 185° F.; penetration (ASTM D–5), about 12; oil content, about 1.1%.

*Wax D.*—This wax is another type of microcrystalline wax similar to wax A. It is prepared from Mid-Continent crudes by deasphalting and dewaxing the residuum from a distillation process. This first product is then further deoiled and solvent dewaxed to remove the lower melting point waxes leaving a product with the following properties: melting point, about 190° F.; penetration (ASTM D–5), about 4; oil content, about 1.0%.

*Wax E.*—This wax is also a so-called "tank bottom wax" from Mid-Continent crudes similar to the described in wax D and prepared in the same general manner. The dehydrating, deasphalting and recrystallization conditions were varied to give a wax having a slightly lower penetration and slightly higher melting point. The general properties of the wax are: melting point, about 195° F.; penetration (ASTM D–5), about 7; oil content, about 1.0%.

The following oil-wax bases which consisted of the designated wax and the base oil were prepared and evaluated for their A. S. T. M. penetration, melting point and flow properties at 130° F. as shown in Table I:

TABLE I

| Wax | Wt. Percent Wax in Base Oil | A. S. T. M. Penetration, mm./10 [1] | Melting Point, °F.[2] | Flow @ 130° F.[3] |
| --- | --- | --- | --- | --- |
| Wax A | 10.0 | 210 | 151.0 | Fail. |
|       | 14.0 | 180 | 156.0 | Pass. |
| Wax B | 17.0 | 270 | 144.0 | Fail. |
|       | 22.2 | 220 | 148.0 | Fail. |
| Wax C | 11.0 | 185 | (*) | (*) |
|       | 7.0  | 262 | (*) | Fail. |
| Wax D | 11.0 | 142 | (*) | (*) |
|       | 8.0  | 159 | (*) | (*) |
|       | 4.0  | 231 | (*) | Fail. |
| Wax E | 8.0  | 167 | (*) | (*) |
|       | 4.0  | 225 | (*) | Fail. |

*Not determined.
[1] A. S. T. M. Designation 937–49T.
[2] A. S. T. M. Designation D127–49.
[3] Determined in accordance with Specification MIL–C–11796A. In this test, panels were coated with a 50–55 mm. film and heated for 3 hours at 130° F. Any flow during this period of heating fails in this test.

It will be seen from Table I above that it was impossible to prepare a satisfactory rust preventive composition with a base consisting solely of the base oil and any of the aforementioned waxes. More specifically, it will be noted that compositions containing relatively low percentages of wax failed in the flow test, whereas compositions containing relatively high percentages of wax failed to provide a composition having an A. S. T. M. penetration in the range of about 200 to 325 mm./10.

In accordance with this invention, metal soap of high molecular weight fatty acid was added to oil-wax bases to formulate compositions having A. S. T. M. penetrations in the range of 200 to 325 mm./10, melting points above 135° F. and flow points above 130° F. In this example, the metal soap was added in the form of a grease (hereinafter referred to as grease H) which contained about 12 wt. percent of a combination of lithium and calcium soaps of animal fatty acids. The animal fatty acids were commercial acids obtained from hydrolyzed tallow and had an iodine number of about 40 and a saponification number of about 200 and had the following approximate composition:

| Acid: | Weight percent |
| --- | --- |
| Myristic | 3.0 |
| Palmitic | 29.0 |
| Stearic | 18.5 |
| Oleic | 46.5 |
| Linoleic | 3.0 |
|  | 100.0 |

The molar ratio of lithium soap to calcium soap in grease H was about 4:1. The grease was prepared by mixing the fatty acids and about one-half of the mineral oil (70 S. U. S. at 210° F.) in a steam kettle and adding calcium hydroxide powder after the temperature had reached about 160° F. Heating and stirring were continued and lithium hydroxide was added as a 10% aqueous solution at about 200° F. The composition was then further heated to about 290° F. for about 1 hour until the grease was dehydrated. Heating was discontinued and the balance of the mineral oil was added with stirring over a period of about 1 to 2 hours and the mixture passed through a high-shear milling device at temperatures below 150° F.

The following hot-dip rust preventive composition was prepared using the base oil, wax A and grease H in accordance with the present invention:

TABLE II

| Composition, Wt. Percent | | | A. S. T. M. Penetration, mm./10 [1] | Melting Point, °F.[2] | Flow @ 130° F.[3] |
| --- | --- | --- | --- | --- | --- |
| Base Oil | Wax A | Grease H* | | | |
| 75 | 20 | 5 | 232 | 158 | Pass. |

*Contains 12% by weight of soap.
[1] A. S. T. M. Designation D937–49T.
[2] A. S. T. M. Designation D127–49.
[3] Determined in accordance with Specification MIL–C–11796A. In this test, panels were coated with a 50–55 mm. film and heated for 4 hours at 130° F. Any flow during this period of heating fails in this test.

It will be noted that the composition shown in Table II had the properties necessary to formulate an acceptable rust preventive composition. Additional blends were prepared to develop the curves shown in Fig. 1. In this drawing, the curve entitled "0.6% Soap" refers to those compositions which contained 5 wt. percent of grease H, and the curve entitled "0.24% Soap" refers to those blends which contained 2 wt. percent of grease H. Fig. 2 shows the A. S. T. M. penetrations and flow properties of the compositions of Fig. 1. It should be noted that only those compositions shown in Fig. 2 which have flow temperatures above 130° F. and A. S. T. M. penetrations in the range of about 200 to 325 are acceptable.

Other blends in accordance with this invention were prepared utilizing the base oil, wax A and about 0.5% by weight of aluminum stearate.

Hot-dip rust preventive compositions were also prepared in accordance with this invention using the base oil, wax B and grease H as shown below:

TABLE III

| Composition, Wt. Percent | | | A. S. T. M. Penetration, mm./10 [1] | Melting Point, °F. [2] | Flow @ 130° F. [3] |
|---|---|---|---|---|---|
| Base Oil | Wax B | Grease H* | | | |
| 65 | 30 | 5 | 272 | 152 | Pass. |
| 68 | 30 | 2 | 253 | 150 | Pass. |

*Contains 12 wt. percent of soap.
[1] A. S. T. M. Designation D937–49T.
[2] A. S. T. M. Designation D127–49.
[3] Determined in accordance with Specification MIL–C–11796A. In this test, panels were coated with a 50-55 mm. film and heated for 4 hours at 130° F. Any flow during this period of heating fails in this test.

It will be noted that the compositions in Table III have the required A. S. T. M. penetration, melting point and flow properties to form acceptable rust preventive compositions.

*Example II*

Two rust preventive compositions were then prepared utilizing the base oil and wax A with other ingredients. An additive concentrate containing as the active ingredient about 30% by weight of calcium alkyl benzene sulfonate was employed as a corrosion inhibitor. One of the blends also contained phenyl alpha naphthylamine as an oxidation inhibitor. Shown below, in Table IV, are the formulations of these two compositions as well as their critical properties:

TABLE IV

| Composition, Wt. Percent | Soft Film Hot-Dip Rust Preventive | | Desired Values |
|---|---|---|---|
| | I | II | |
| | Percent | Percent | |
| Base Oil | 69.0 | 71.5 | |
| Wax A | 11.0 | 15.0 | |
| Grease H* | | 3.0 | |
| Calcium Sulfonate (30% conc. in oil) | 20.0 | 10.0 | |
| Phenyl α-Naphthylamine | | 0.5 | |
| | 100.0 | 100.0 | |
| Penetration, mm./10 | 223 | 226 | 200–325. |
| Melting Point (Est.) | 148 | 154 | >135° F. |
| Flow @ 130° F | Complete | None | None. |
| JAN–H–792 Humidity Cabinet Life, Hrs. | 720+ | 720+ | 720 Min. |

*Contains 12% Li-Ca soap.

It will be noted that composition I, which does not contain any metal soap of fatty acids, fails in the flow test although its melting point is above 135° F. This would be expected in view of the results shown in Table I of Example I which showed that acceptable rust preventive compositions could not be prepared utilizing purely oil-wax bases. On the other hand, composition II, which was formulated in accordance with the present invention, successfully passed the A. S. T. M. penetration, melting point and flow test at 130° F. Composition II also gave excellent results in the JAN–H–792 humidity cabinet test, which test measures the rust protective properties of a given rust preventive composition.

What is claimed is:

1. A hot-dip rust preventive composition comprising: in the range of 70 to 80 wt. percent of a mineral oil having a viscosity in the range of 150 to 300 SUS at 210° F.; in the range of 12 to 18 wt. percent of a microcrystalline wax having a melting point in the range of 170° to 200° F.; in the range of 2.0 to 4.0 wt. percent of a calcium sulfonate; in the range of 0.1 to 1.0 wt. percent of phenyl α-naphthylamine; and in the range of 0.2 to 0.5 wt. percent of the calcium and lithium soaps of fatty acids having in the range of 14 to 18 carbon atoms per molecule, the molar ratio of lithium soap to calcium soap being in the range of 3:1 to 5:1.

2. A soft film hot-dip rust preventive composition consisting of 71.5 wt. percent of a mineral oil having a viscosity of 200 SUS at 210° F. and a pour point of 0° F., 15 wt. percent of a deoiled and recrystallized microcrystalline wax having a melting point of 175° F. and a penetration of 20, 3.0 wt. percent of a grease containing 12 wt. percent of lithium and calcium soaps of fatty acids obtained from hydrolyzed tallow, the molar ratio of lithium soap to calcium soap being about 4 to 1, 10 wt. percent of a 30% calcium sulfonate in oil concentrate, and 0.5 wt. percent of phenyl-alpha-naphthylamine.

References Cited in the file of this patent

UNITED STATES PATENTS

| 1,472,239 | Buell | Oct. 30, 1923 |
| 2,430,846 | Morgan | Nov. 11, 1947 |
| 2,471,638 | McCarthy | May 31, 1949 |
| 2,595,158 | McCue et al. | Apr. 29, 1952 |